US005246240A

United States Patent [19]

Romich et al.

[11] Patent Number: 5,246,240

[45] Date of Patent: Sep. 21, 1993

[54] APPARATUS FOR MOUNTING EQUIPMENT TO WHEELCHAIRS

[76] Inventors: Barry A. Romich, 1560 Burbank Rd., Wooster, Ohio 44691; Benjamin A. Romich, Jr., 13875 Cleveland Rd., Creston, Ohio 44217

[21] Appl. No.: 779,380

[22] Filed: Oct. 18, 1991

[51] Int. Cl.[5] ............................................. B60R 11/02

[52] U.S. Cl. .............................. 280/304.1; 224/42.44; 108/44; 108/139; 248/919; 297/194; 297/DIG. 4

[58] Field of Search .......................... 280/304.1, 250.1; 224/42.44, 42.43; 108/42, 44, 139; 248/647, 919, 918, 917, 282; 297/DIG. 4, 194

[56] References Cited

U.S. PATENT DOCUMENTS

| | | | |
|---|---|---|---|
| 1,318,703 | 10/1919 | Stuchlak | 108/139 X |
| 2,193,647 | 3/1940 | Rush et al. | 108/139 X |
| 4,455,008 | 6/1984 | Mackew | 297/194 X |
| 4,620,808 | 11/1986 | Kurtin et al. | 248/919 X |
| 5,118,127 | 6/1992 | Partington | 280/304.1 X |

OTHER PUBLICATIONS

"Current Expressions" newsletter from Prentke Romich Company, Summer, 1991.

"Current Expressions" newsletter from Prentke Romich Company, Spring, 1991.

"Changing Lives" catalog from Prentke Romich Company.

*Primary Examiner*—Robert J. Oberleitner
*Assistant Examiner*—Kevin Hurley
*Attorney, Agent, or Firm*—Renner, Kenner, Greive, Bobak, Taylor & Weber

[57] ABSTRACT

An apparatus (10) for movably mounting equipment (11) on a wheelchair (12) having an armrest (12*a*) and a back support (12*b*), which comprises first and second pivot assemblies (20, 21), a longitudinal body member (40) spacing and joining the first and second pivot assemblies (20, 21) and rotatable about a fixed axle (50) of the first pivot assembly (20). There may also be provided a device (22) to attach the fixed axle (50) to the wheelchair (12), a rotatable axle (51) in the second pivot assembly (21) supporting the equipment (11), and an assembly such as pulleys (80, 81) and a cable (83) for rotating the rotatable axle (51) as a function of the rotation of the body member (40) relative to the fixed axle (50). Rotation of the body member (40) relative to the fixed axle (50) effects rotation of the rotatable axle (51) such that the equipment (11) remains orthogonal to the armrest (12*a*) of the wheelchair (12) during movement from a position in front of the wheelchair (12) to a position to the rear of the back support (12*b*) of the wheelchair (12).

20 Claims, 5 Drawing Sheets

APPARATUS FOR MOUNTING EQUIPMENT TO WHEELCHAIRS

TECHNICAL FIELD

This invention relates to a device for mounting equipment such as communication devices, computers or other objects, to wheelchairs. More particularly, the invention relates to a device for selectively positioning such equipment in front of the person seated in the wheelchair and behind the wheelchair for storage, as well as at various intermediate positions.

BACKGROUND OF THE INVENTION

It is often desired in the art to mount, attach or otherwise affix, various pieces of equipment to wheelchairs. For example, a wheelchair user with limited speech capability may wish to have a speech augmenting device positioned to be easily accessible when from a seated position in the wheelchair. Such a speech augmenting device is used to help with communications, such as by having the operator push buttons which results in activation of a synthetic voice or prerecorded message. In other instances, wheelchair users find it useful to have computers or other types of equipment mounted upon a wheelchair for easy access and use.

By the term "equipment" as used herein, it is understood to mean any such devices or other objects without limitation. Also, terms such as "user" and "operator" or the like shall collectively refer to a person seated in the wheelchair endeavoring to operate and position the equipment. Furthermore, persons skilled in the art will understand from the following discussion, how the present invention might be employed in conjunction with other devices in addition to wheelchairs, such as fixed chairs, gurneys or the like, all of such applications of the invention being within the scope thereof. By use of the term "wheelchair" therefore, such other applications are equally contemplated.

Fixed brackets have been employed to position equipment upon wheelchairs for use by the wheelchair user, either by positioning the equipment in front of the user or at the user's side. It has been found, however, that fixed brackets have a number of disadvantages. For example, if the bracket positions the equipment piece directly in front of the user, it often proves difficult for the user to position the wheelchair at a table, because the equipment piece and/or the bracket itself often engages the table making it difficult or impossible to be positioned in close enough proximity to the table. Furthermore, brackets which position equipment to the side of a wheelchair effectively expand the overall width of the chair, thereby making it difficult to pass through constricted areas such as doorways, and making the equipment more prone to being struck or impacted by surrounding structures. Because much of the equipment often includes sensitive electronic components or the like, such impact can readily damage the equipment.

Therefore, a need exists for a mounting device for selectively positioning equipment in various positions relative to a wheelchair.

SUMMARY OF INVENTION

It is therefore, an object of the present invention to provide a device to mount equipment on a wheelchair.

It is another object of the present invention to provide a device as above, for selectively positioning the equipment optimum locations for use by the user seated in the wheelchair.

It is yet another object of the present invention to provide a device as above, for selectively positioning equipment in a location for convenient operation of the equipment by the user seated in the wheelchair and in a position for out-of-the-way storage of the equipment.

At least one or more of the foregoing objects, together with the advantages thereof over the known art relating to devices for mounting equipment to wheelchairs, which shall become apparent from the specification which follows, are accomplished by the invention as hereinafter described and claimed.

In general the present invention provides an apparatus for movably mounting equipment on a wheelchair having an armrest and a back support, which comprises first and second pivot means, a longitudinal body member spacing and joining the first and second pivot means and rotatable about a fixed axle of the first pivot means. There is also provided means to attach the fixed axle to the wheelchair, a rotatable axle in the second pivot means supporting the equipment, and means for rotating the rotatable axle as a function of the rotation of the body member relative to the fixed axle. Rotation of the body member relative to the fixed axle effects rotation of the rotatable axle such that the equipment remains orthogonal to the armrest of the wheelchair during movement from a position in front of the wheelchair to a position to the rear of the back support of the wheelchair.

There is also provided according to the present invention, an apparatus for movably mounting equipment on a wheelchair, which comprises first and second pivot means. The first pivot means has a fixed axle, and the second pivot means has a rotatable axle supporting the equipment. A longitudinal body member spaces and joins the first and second pivot means, and is rotatable about the fixed axle. There is also provided means to attach the fixed axle to the wheelchair. The equipment is rotatable with the rotatable axle, and the body member is rotatable about the fixed axle, to move the equipment.

PREFERRED EMBODIMENT FOR CARRYING OUT THE INVENTION

Figure 1:
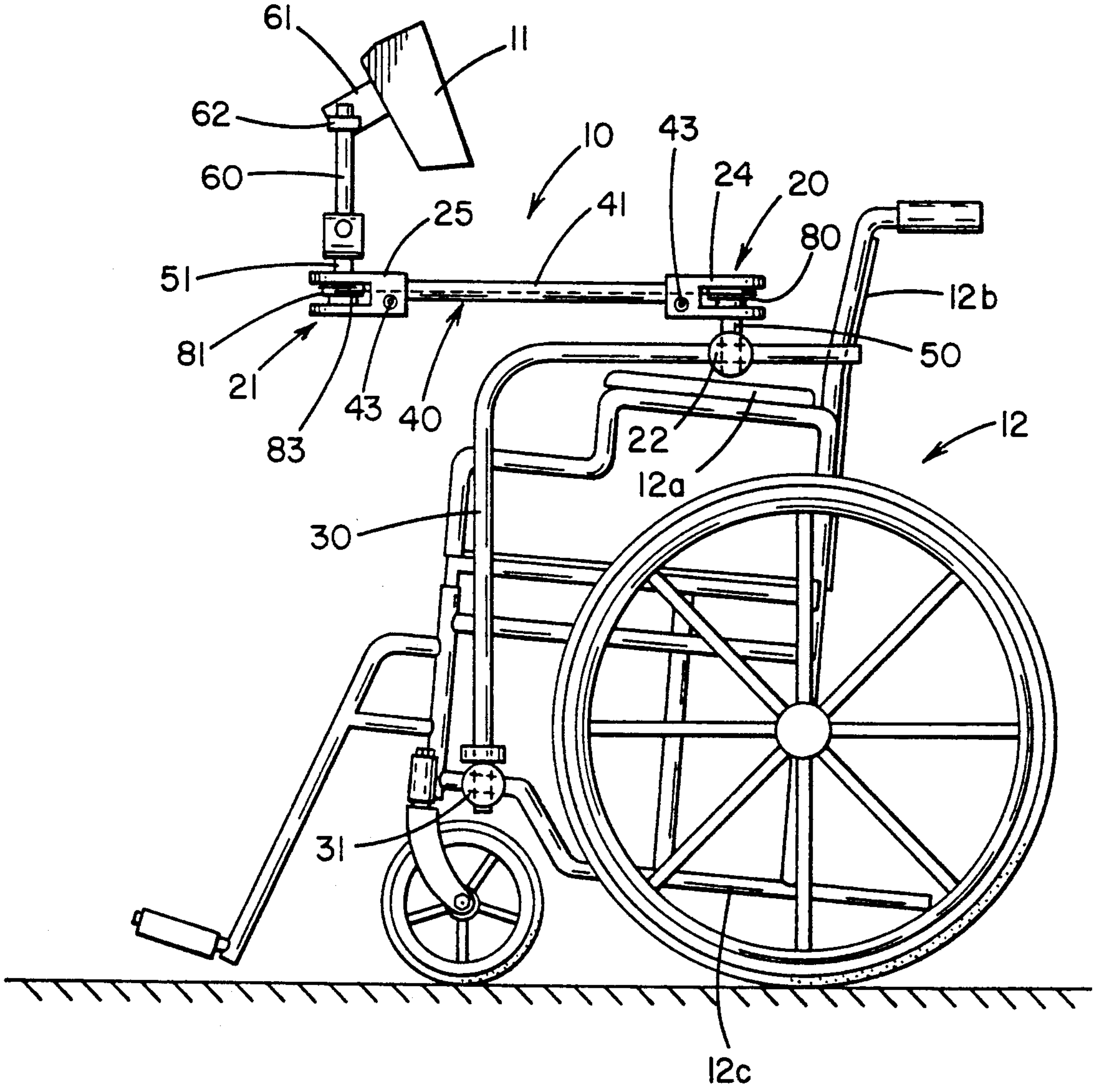
FIG. 1 is a side elevational view of an exemplary mounting device according to the concepts of the present invention, and shown in the environment of being mounted to a wheelchair.

An exemplary embodiment of the present invention is directed toward a mounting device is generally indicated by the numeral 10 on the attached drawings. Mounting device 10 is employed, as will be hereinafter described, to mount a piece of equipment 11 to a wheelchair, generally indicated by the numeral 12 in FIG. 1. As shown, wheelchair 12 is of conventional design, having an armrest 12*a*, a back support 12*b*, and a frame member 12*c*.

Figure 3:
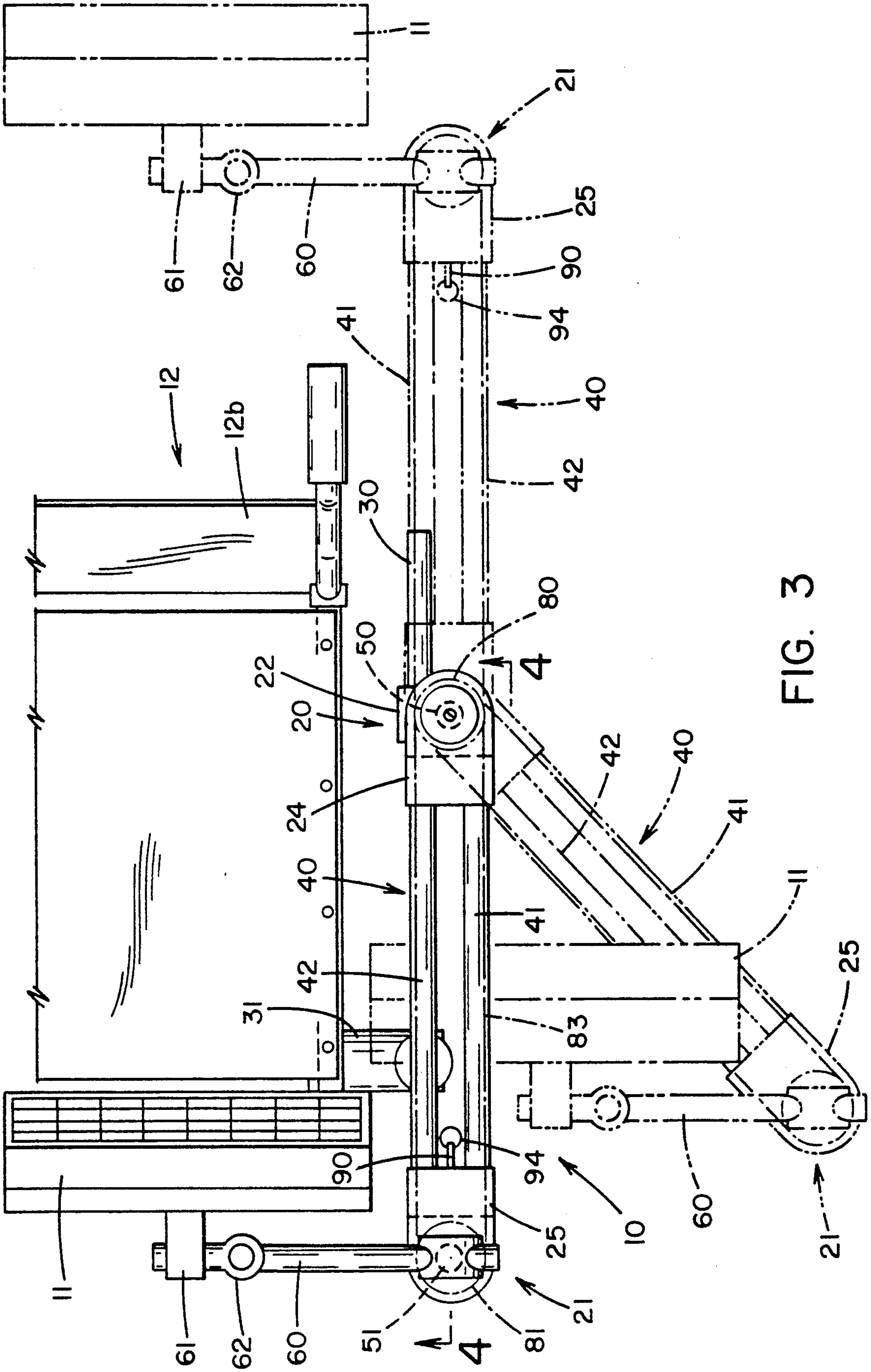
FIG. 3 is a top plan view of the device as depicted in FIG. 2.
Figure 5:
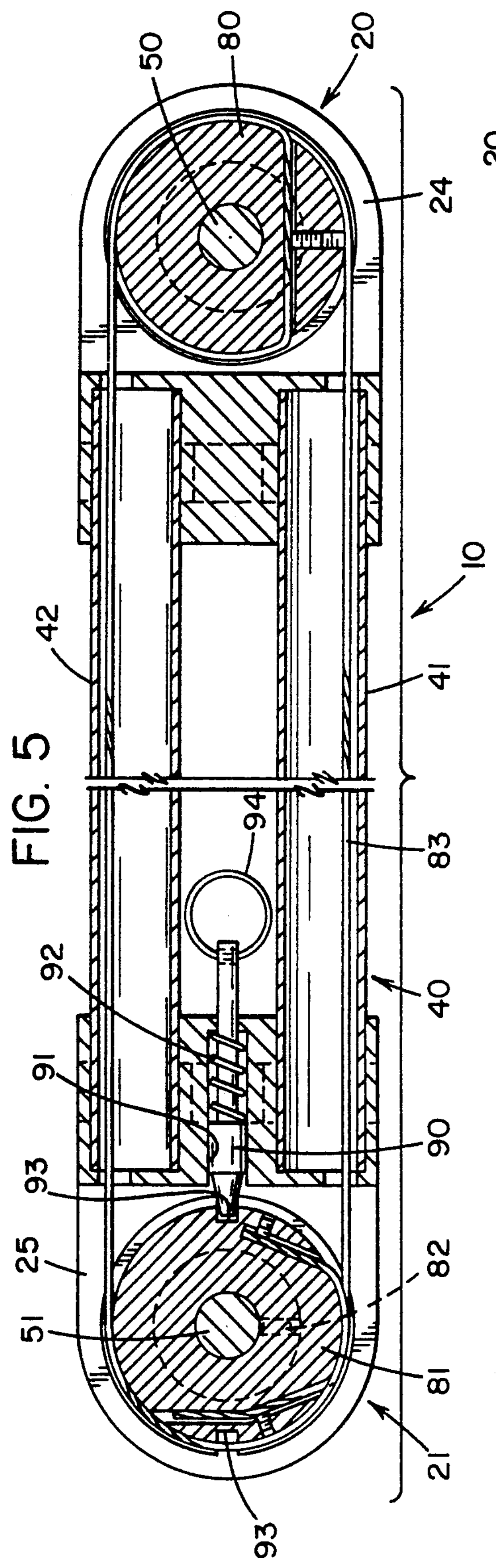
FIG. 5 is a cross sectional top plan view of a first pivot assembly taken substantially along line 5—5 of FIG. 4; and, FIG. 6 is a cross sectional of a second pivot assembly view taken substantially along line 6—6 of FIG. 4.

While equipment piece 11 as shown in the drawings is representative of a speech augmenting device, equipment piece 11 may be any of a variety of devices such as a serving or work tray, a computer, or the like as above defined. Mounting device 10 may be employed to mount any such equipment piece 11 wherein it is desired by a user of equipment piece 11 seated in the wheelchair 12 to selectively position equipment piece 11 in a preselected position for ease of use of equipment piece 11. For example, as shown in FIG. 1, equipment piece 11 is located in an operating position generally in front of wheelchair 12. As shown in FIG. 3, equipment piece 11 may also be located in a storage position generally behind or in the rear of wheelchair 12, or even angularly to the side of wheelchair 12, these positions being indicated in chain lines on that drawing figure.

Furthermore, while mounting device 10 has particular application to being mounted upon a wheelchair, one skilled in the art will appreciate that it has equal application to other than wheelchairs. For instance, mounting device 10 may be employed with stationary chairs, gurneys, work benches or the like, which while not depicted in the drawings, are as above defined within the scope of the invention. Wheelchair 12 is depicted in the drawings to show an exemplary environmental use of the invention.

Figure 4:
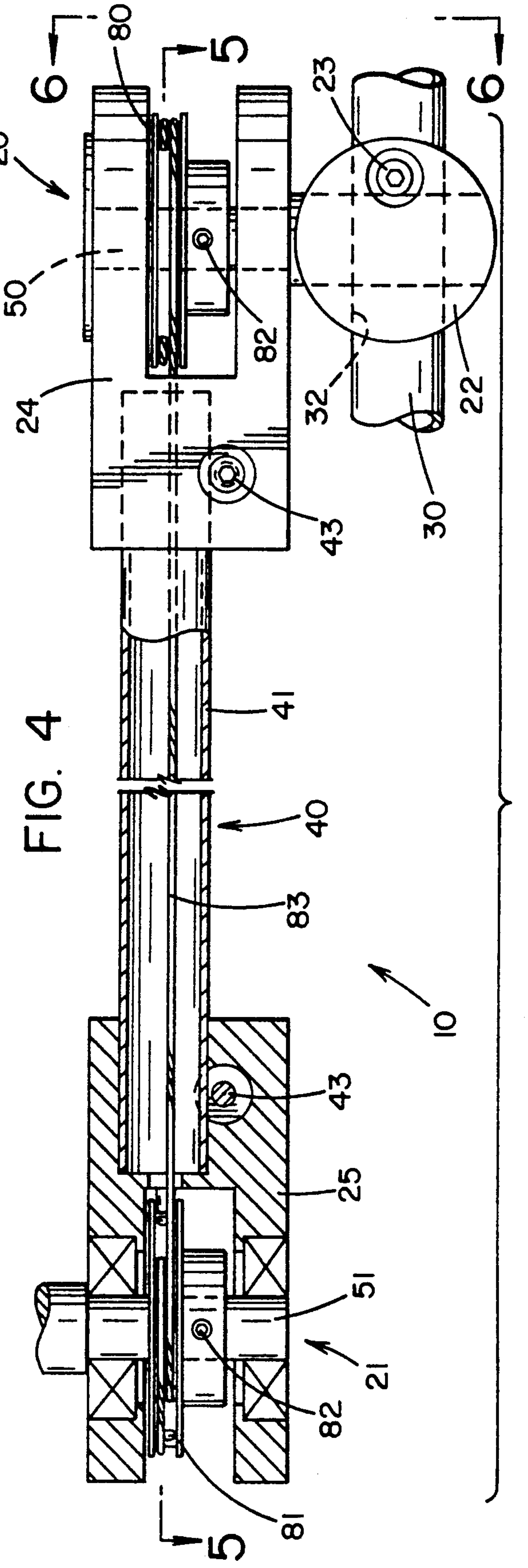
FIG. 4 is an enlarged partial cross sectional side elevational view take substantially along line 4—4 in FIG. 3.

Mounting device 10 preferably includes a first pivot assembly, generally indicated by the number 20, and a second pivot assembly, generally indicated by the numeral 21. First pivot assembly 20 is mounted to wheelchair 12 by any means conventional in the art, such as by a bored block 22 having a set screw 23 therein (FIG. 4). Set screw 23 can be tightened against any portion of wheelchair 12. That is, mounting device 10 may be mounted and secured anywhere on wheelchair 12, wherein it will be most convenient to the user seated in the wheelchair, such varying positions being understood by persons skilled in the art.

Figure 6:
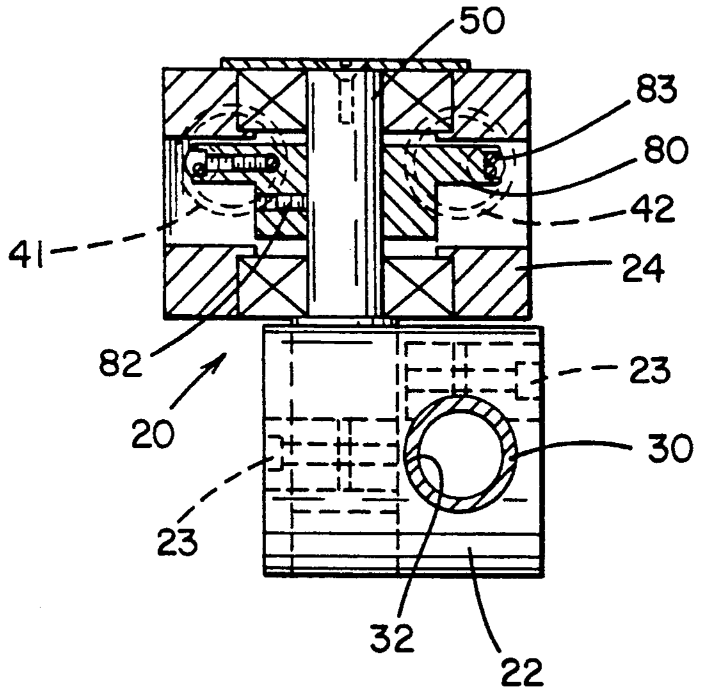

First pivot assembly 20 is preferably provided with a housing 24, while second pivot assembly 21 is provided with a housing 25. One preferred mounting structure for housings 24, 25 includes affixing block 22 to an upstanding generally L-shaped bar 30, which itself is affixed to wheelchair 12 such as by another block 31 attached to frame member 12*c* of the wheelchair 12. It will be appreciated by persons skilled in the art, that pivot assembly 20 may be mounted in ways other than with upstanding bar 30, such as by mounting block 22 to the armrest 12*a* of wheelchair 12, or other portions of frame member 12*c*. As shown, upstanding bar 30 is affixed to block 22 by positioning it within a bore 32 within block 22 (FIGS. 4 and 6). Upstanding bar 30 may be held within bore 32 by friction, by set screw 23 or the like.

Extending between first pivot assembly 20 and second pivot assembly 21, is a body member generally indicated by the numeral 40. For reasons which will become apparent from the discussion to follow, it is preferred that body member 40 include a first body conduit 41 substantially parallel to a second body conduit 42 each having their ends connected to housings 24 and 25. Of course, as will also be appreciated by persons skilled in the art, body member 40 may be of numerous configurations. First and second body conduits 41 and 42 may be affixed to first and second pivot assemblies 20 and 21 by an conventional structure, such as set screws 43 (FIG. 4).

The length of body member 40 is variable depending upon the use to which mounting device 10 is put, as well as the needs of the individual user. For example, as depicted in FIG. 1, body member 40 is of a length which would approximate the requirements for a user desiring to manipulate the equipment 11 by hand. However, if a user had limited arm use, and required the equipment 11 to be mounted closer for easier reach, body member 40 may be made shorter. It is preferred that body member 40 be of sufficient length such that the equipment 11 may be positioned behind wheelchair 12, and more preferably behind wheelchair back support 12*b*, as shown in FIG. 3.

Pivot assembly 20 includes a fixed axle 50 and pivot assembly 21 includes a rotatable axle 51. As will be appreciated by persons skilled in the art, members other than axles 50 and 51 may be employed and be within the scope of the invention, such as bearing members or the like. Housing member 24 of first pivot assembly 20 is rotatable about fixed axle 50, which rotation causes body member 40 to move and be displaced in a rotating manner also about fixed axle 50, such that body member 40 may be rotatably positioned at a number of positions relative to wheelchair 12, as depicted in FIG. 3 by solid and chain lines. It is to be appreciated that body member 40 moves in substantially a single plane as pivot assembly 20 rotates about fixed axle 50.

The equipment 11 is supported upon rotatable axle 51 such that as rotatable axle 51 is rotated, equipment piece 11 is also rotated relative to housing 25 and body member 40. Preferably, as will be discussed more fully hereinbelow, rotatable axle 51 rotates such that it and equipment piece 11 remains in substantially the same position relative wheelchair 12. In other words, throughout the rotation of housing member 24 about fixed axle 50, equipment piece 11 remains orthogonal to wheelchair 12, as shown in FIG. 3 by solid and chain lines.

The equipment 11 may be mounted upon and nonrotatably affixed to axle 51 by an intervening laterally extending arcuate support arm 60. As depicted in the drawings, support arm 60 may be substantially L-shaped, such that the equipment 11 is more nearly positioned in front of wheelchair 12 (and hence, more fully in front of a user seated therein), as will be appreciated by one skilled in the art. Furthermore, when body member 40 is rotated about fixed axle 50 to the storage position (shown in phantom lines in FIG. 2) equipment 11 is positioned more fully behind wheelchair 12, thereby decreasing the likelihood of inadvertent damage thereto during transit operations of wheelchair 12, or the like.

Support arm 60 may be affixed to the equipment 11 by any device conventional in the art, such as by use of attachment block 61 affixed to a ring 62 engageable with support arm 60. It will be appreciated that attachment blocks 61, 22, and 31 may be made to permanently affix the structure with which these devices are used to wheelchair 12, and that they may be made to demountably secure the related structure by quick disconnect or otherwise, all of which is within the scope of the invention and which is conventional in the art.

Figure 2:
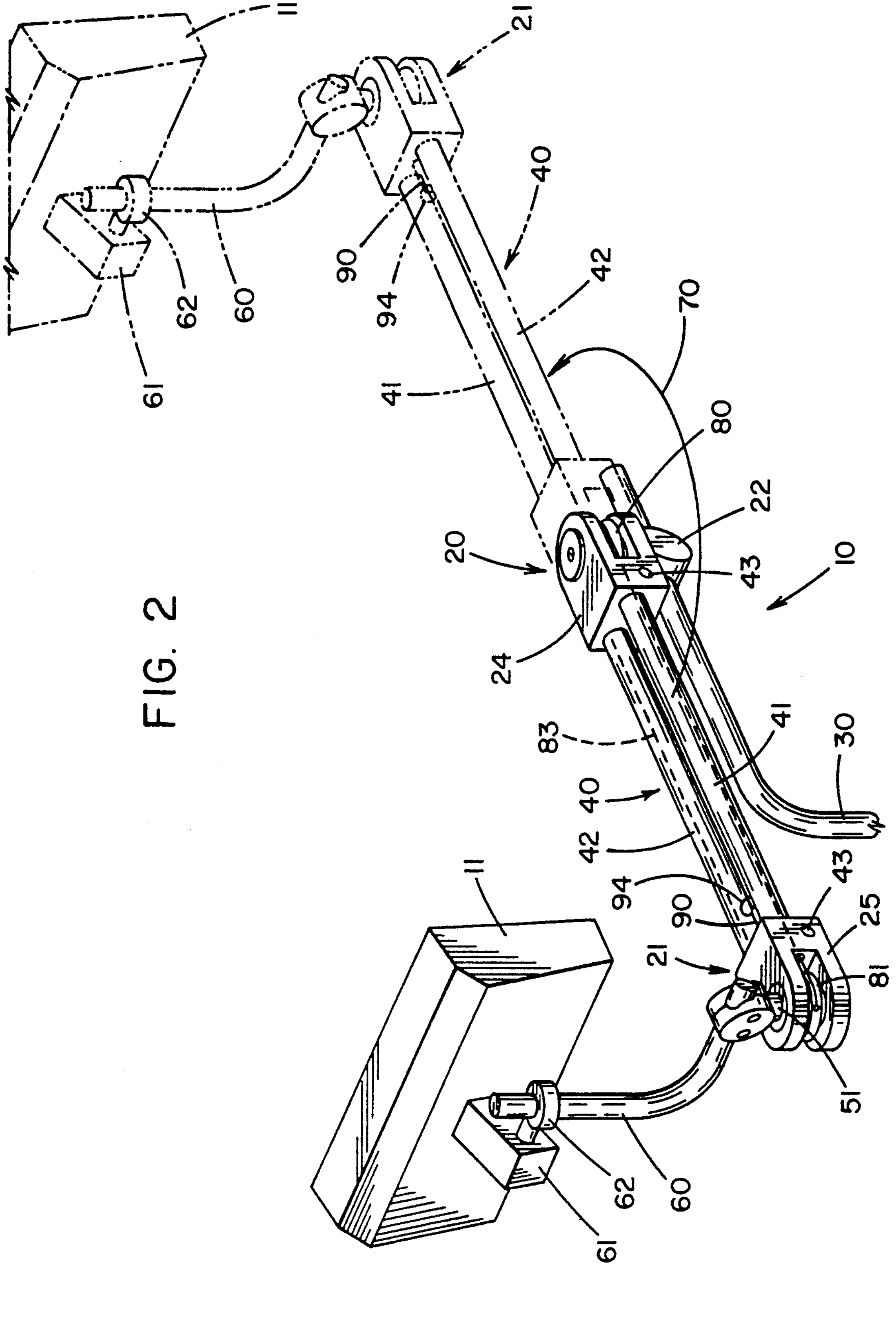
FIG. 2 is a perspective view of the mounting device depicted in FIG. 1, showing the device employed to mount equipment in an operating position for use by a user seated in the wheelchair, and showing the device and the equipment in a storage position in chain lines.

In use, mounting device 10 is moved between positions by rotating housing member 24 about fixed axle 50, one such direction of rotation being represented by arrow 70 in FIG. 2. Equipment piece 11 may then be rotated by rotation of axle 51 within housing member 25, to position equipment piece 11 for storage or use as was discussed hereinabove.

In a preferred embodiment of the invention, rotation of housing member 24 about axle 50 and rotation of axle 51 within housing member 25 is accomplished equiangularly and/or synchronistically, such that the user need only effect rotation of housing member 24 about axle 51 to accomplish both rotations. This synchronous rotation may be accomplished in a variety of ways such as by use of synchronized drive motors, interdependent linkages or the like, all of which are within the scope of the invention. The embodiment of the invention depicted in the drawings, employs first and second pulleys 80 and 81, housed within first and second housing members 24 and 25, respectively. Pulleys 80 and 81 may be positioned within housing members 24 and 25 in any manner conventional in the art, such as by affixing pulleys 80 and 81 to axles 50 and 51, respectively by use of set screws 82. A tensioned cable 83 connects pulleys 80 and 81, such that as housing member 24 is rotated about fixed axle 50, pulley 81 is caused to rotate to an equiangular degree where the pulleys 80 and 81 are of the same diameter, as shown. Of course, the degree of angular rotation may be varied by providing pulleys 80 and 81 of different diameters. Thus, the degree of angular rotation of rotatable axle 51 and pulley 81 mounted thereon, is a function of the rotation of body member 40 about and relative to fixed axle 50.

As shown, the cable 83 is reeved about each of the pulleys 80, 81 several times with the ends fixedly attached thereto. Hence, as first housing member 24 is caused to be rotated about axle 50, cable 83 is caused to take up on pulley 80 and thus exerting a force upon pulley 81, causing it to rotate to let off cable 83, as will be appreciated by one skilled in the art. Of course, cable 83 may be an elastic belt, powered drive belt or may even be a chain drive attached to toothed sprockets (not shown) instead of pulleys 80 and 81, or any such assembly, and still be within the scope of the invention. By being hollow, conduits 41 and 42 of body member 40 allow cable 83 to extend therethrough and be reeved about pulleys 80 and 81. It will be appreciated by one skilled in the art, that the synchronous rotation of pulleys 80 and 81, ensures that equipment piece 11 will remain orthogonal to wheelchair 12 at any position of body member 40 relative to wheelchair 12.

It is advantageous to be able to lock mounting device 10 in any position a user may adjust the equipment 11 relative to wheelchair 12. This may be accomplished by various devices conventional in the art, including friction fit devices, clamps or the like. One exemplary means of locking mounting device 10 in a preselected position would include a locking pin 90 positioned through an aperture 91 in housing member 25. Locking pin 90 is spring biased such as by use of coil spring 92, which urges locking pin 90 axially toward pulley 81. Pulley 81 is provided with detents 93, such that when a detent 93 is aligned with locking pin 90, locking pin 90 is biased into locking engagement therewith, thereby preventing rotation of pulley 81. To release pulley 81 to effect rotation of mounting device 10, locking pin 90 is axially retracted from detent 93, as by a pull ring 94 which facilitates grasping by a user. As will be appreciated, a plurality of detents such as detent 93 may be employed such that body member 40 may be locked in a variety of selected rotational positions.

Thus it should be evident that the device of the present invention is highly effective and flexible in mounting a piece of equipment 11 relative to a wheelchair 12. The invention is particularly suited for use with wheelchairs, but is not necessarily limited thereto. The device of the present invention can be used separately with equipment other than equipment piece 11 as discussed hereinabove.

Based upon the foregoing description, it should now be apparent that the use of the mounting device 10 described herein will carry out the objects set forth hereinabove. It is, therefore, to be understood that any variations evident fall within the scope of the claimed invention and thus, the selection of specific component elements can be determined without departing from the spirit of the invention herein disclosed and described. For example, mounting blocks 22, 31 and 61 according to the present invention are not necessarily limited to those depicted, and may be equally replaced with clamps, screws, welds or the like. Moreover, as noted hereinabove, other means for causing the optionally synchronous rotation of axle 51 and rotation of housing member 24 about fixed axle 50 can be substituted for the pulleys 80 and 81 and the cable 83 discussed hereinabove. Thus, the scope of the invention shall include all modifications and variations that may fall within the scope of the attached claims.

What is claimed is:

1. Apparatus for movably mounting equipment on a wheelchair having an armrest and a back support, comprising first and second pivot means, a longitudinal body member spacing and joining said first and second pivot means and rotatable about a fixed axle of said first pivot means, means to attach said fixed axle to the wheelchair, a rotatable axle in said second pivot means supporting the equipment, and means for rotating said rotatable axle as a function of the rotation of said body member relative to said fixed axle, whereby rotation of said body member relative to said fixed axle effects rotation of said rotatable axle such that the equipment remains orthogonal to the armrest of the wheelchair during movement from a position in front of the wheelchair to a position to the rear of the back support of the wheelchair.

2. An apparatus as set forth in claim 1, wherein said means for rotating said rotatable axle as a function of the rotation of said body member relative to said fixed axle includes a first pulley affixed to said fixed axle, and a second pulley affixed to and rotatable with said rotatable axle.

3. A device, as set forth in claim 2, wherein said first and second pulleys are connected via cable means.

4. A device, as set forth in claim 3, wherein said body member comprises first and second conduits.

5. A device, as set forth in claim 4, wherein said cable means is positioned within said first and second conduits.

6. A device, as set forth in claim 1, wherein the equipment is supported by said rotatable axle via a laterally extending support arm.

7. A device, as set forth in claim 6, wherein said laterally extending support arm is L-shaped and has first and second ends.

8. A device, as set forth in claim 7, wherein said first end of said L-shaped support arm is affixed to the equipment, and said second end of said L-shaped support arm is affixed to said rotatable axle.

9. A device, as set forth in claim 1, further comprising locking means for locking at least one of said pivot means in a preselected position.

10. A device, as set forth in claim 9, wherein said locking means includes a spring biased pin selectively engageable with at least one detent in said pivot means.

11. An apparatus for movably mounting equipment on a wheelchair comprising first and second pivot means; said first pivot means having a fixed axle; said second pivot means having a rotatable axle supporting the equipment; a longitudinal body member spacing and joining said first and second pivot means, and rotatable about said fixed axle; means to attach said fixed axle to the wheelchair; and, means for rotating said rotatable axle as a function of the rotation of said body member relative to said fixed axle; such that said equipment is rotatable with said rotatable axle, and said body member is rotatable about said fixed axle, to move the equipment.

12. An apparatus, as set forth in claim 11, wherein said first pivot means comprises a first pulley affixed to said fixed axle, and said second pivot means comprises a second pulley affixed to said rotatable axle.

13. An apparatus, as set forth in claim 12, wherein said first and second pulleys are connected via cable means, such that rotation of said body member about said fixed axle and rotation of said rotatable axle is synchronistically effected.

14. An apparatus, as set forth in claim 13, wherein said body member comprises first and second conduits.

15. An apparatus, as set forth in claim 14, wherein said cable means is positioned within said first and second conduits.

16. An apparatus, as set forth in claim 11, further comprising a laterally extending support arm affixed to the equipment and said rotatable axle to effect said supporting of the equipment by said rotatable axle.

17. An apparatus, as set forth in claim 16, wherein said laterally extending support arm is L-shaped and has first and second ends.

18. An apparatus, as set forth in claim 17, wherein said first end of said L-shaped support arm is affixed to the equipment, and said second end of said L-shaped support arm is affixed to said rotatable axle.

19. An apparatus, as set forth in claim 11, further comprising locking means for locking at least one of said pivot means in a preselected position.

20. An apparatus, as set forth in claim 19, wherein said locking means includes a spring biased pin selectively engageable with at least one detent in said pivot means.

* * * * *